United States Patent
Sankar et al.

(10) Patent No.: US 9,654,184 B2
(45) Date of Patent: May 16, 2017

(54) TRANSMITTER TO RECEIVER COMMUNICATION LINK IN A WIRELESS POWER SYSTEM

(71) Applicants: Ganapathy Sankar, Cupertino, CA (US); Manjit Singh, Fremont, CA (US)

(72) Inventors: Ganapathy Sankar, Cupertino, CA (US); Manjit Singh, Fremont, CA (US)

(73) Assignee: WIPQTUS INC., Cupertino, CA (US)

(*) Notice: Subject to any disclaimer, the term of this patent is extended or adjusted under 35 U.S.C. 154(b) by 683 days.

(21) Appl. No.: 13/942,712

(22) Filed: Jul. 16, 2013

(65) Prior Publication Data

US 2014/0162554 A1 Jun. 12, 2014

Related U.S. Application Data

(60) Provisional application No. 61/673,736, filed on Jul. 20, 2012.

(51) Int. Cl.
  *H04B 5/00* (2006.01)
  *H02J 17/00* (2006.01)

(52) U.S. Cl.
  CPC ............ *H04B 5/0081* (2013.01); *H02J 17/00* (2013.01); *H04B 5/0031* (2013.01); *H04B 5/0037* (2013.01)

(58) Field of Classification Search
None
See application file for complete search history.

(56) References Cited

U.S. PATENT DOCUMENTS

| | | | | |
|---|---|---|---|---|
| 5,701,121 A | * | 12/1997 | Murdoch | B61L 23/005 340/10.34 |
| 8,325,042 B1 | * | 12/2012 | Hyde | G06K 19/07749 340/10.1 |
| 2002/0077710 A1 | * | 6/2002 | Harrington | G01V 15/00 700/13 |
| 2003/0155349 A1 | * | 8/2003 | Matsuo | H05B 6/06 219/664 |
| 2007/0109274 A1 | * | 5/2007 | Reynolds | G06F 3/041 345/173 |
| 2007/0109819 A1 | * | 5/2007 | Powell | H03C 1/08 363/21.02 |

(Continued)

*Primary Examiner* — Zhiyu Lu
(74) *Attorney, Agent, or Firm* — Lipton, Weinberger & Husick; Ash Tankha

(57) ABSTRACT

A method and system for establishing a communication link in a wireless power system from a wireless power transmitter (WPT) to a wireless power receiver (WPR) is provided. A flux modulator is operably disposed in the WPT for dynamically changing the WPT's impedance so as to modulate a magnetic field produced on the transmitter coil when a primary voltage applied to the WPT. A flux demodulator is operably disposed in the WPR for receiving and demodulating a secondary voltage induced on a receiver coil due to the modulated magnetic field on the transmitter coil. The induction of the secondary voltage on the receiver coil due to the modulated magnetic field on the transmitter coil establishes the communication link from the WPT to the WPR. The flux demodulator is configured as an analog signal processing chain or a digital signal processing block for decoding information obtained from the WPT.

5 Claims, 7 Drawing Sheets

(56) References Cited

U.S. PATENT DOCUMENTS

| | | | | |
|---|---|---|---|---|
| 2009/0058361 | A1* | 3/2009 | John | A61N 1/3785 320/128 |
| 2009/0256674 | A1* | 10/2009 | Lee | B60R 25/24 340/5.6 |
| 2010/0103055 | A1* | 4/2010 | Waku | G06K 19/0723 343/702 |
| 2010/0117596 | A1* | 5/2010 | Cook | B60L 11/182 320/108 |
| 2011/0043050 | A1* | 2/2011 | Yabe | H01F 27/2804 307/104 |
| 2012/0139356 | A1* | 6/2012 | Jung | H02J 7/025 307/104 |
| 2012/0206098 | A1* | 8/2012 | Kim | B60L 11/182 320/108 |
| 2013/0005251 | A1* | 1/2013 | Soar | B60N 2/4876 455/41.1 |
| 2013/0039395 | A1* | 2/2013 | Norconk | H04B 5/0031 375/219 |
| 2014/0022132 | A1* | 1/2014 | Badaruzzaman | H03H 7/40 343/745 |
| 2014/0346886 | A1* | 11/2014 | Yang | G06K 19/07779 307/104 |

* cited by examiner

TRANSMITTER TO RECEIVER COMMUNICATION LINK IN A WIRELESS POWER SYSTEM

CROSS REFERENCE TO RELATED APPLICATIONS

This application claims the benefit of provisional patent application No. 61/673,736 titled "Transmitter To Receiver Communication Link In A Wireless Charging System", filed in the United States Patent and Trademark Office on Jul. 20, 2012.

The specification of the above referenced patent application is incorporated herein by reference in its entirety.

BACKGROUND

A wireless power system typically comprises a wireless power transmitter and a wireless power receiver. The wireless power transmitter transmits power wirelessly using a transmitter coil. Through the transmitter coil, the wireless power transmitter creates an electromagnetic field in a coupling region for providing energy transfer to the wireless power receiver. The wireless power receiver comprises a receiver coil that picks up the electromagnetic field. A voltage is induced in a receiver coil due to the electromagnetic field emanating from the transmitter coil. In the coupling region, power is transferred from the wireless power transmitter to the wireless power receiver.

In conventional wireless power systems, there is only one way communication from the wireless power receiver to the wireless power transmitter. This communication link is used by the wireless power receiver to relay information, for example, messages to increase power being transmitted, decrease power being transmitted, maintain the same amount of power being transmitted, terminate transmission of power, etc., to the wireless power transmitter. In conventional wireless power systems, there is no communication link from the wireless power transmitter to the wireless power receiver. As a result, the transmitter cannot query and obtain any information from the receiver.

With a communication link from the transmitter to the receiver, communication between the devices is bi-directional. This allows the construction of smarter, differentiated wireless power systems. For example, the transmitter can challenge and authenticate the identity of the receiver. If the receiver is a "known" device, the transmitter can turn on certain algorithms or reconfigure itself to enable higher power delivery or allow more spatial separation. The transmitter could also reconfigure the receiver to maintain stable power delivery. Therefore, there is a long felt but unresolved need for a method and system that establishes a communication link from a wireless power transmitter to a wireless power receiver.

SUMMARY OF THE INVENTION

A method and system for establishing a communication link in a wireless power system is provided. The wireless power system comprises a wireless power transmitter and a wireless power receiver. A flux modulator is operably disposed in the wireless power transmitter to send messages to the wireless power receiver. Furthermore, a flux demodulator is operably disposed in the wireless power receiver to recover the messages sent by the flux modulator. The flux modulator is configured to dynamically change the wireless power transmitter's input impedance through a multitude of techniques, for example, an inductance change, a capacitance change, a resistance change, etc., and any combination thereof to change the current in the transmitter coil and hence modulate the transmitted magnetic flux field intensity. The modulated magnetic field of the transmitter coil induces a modulated secondary voltage on a receiver coil. The induction of the modulated secondary voltage on the receiver coil due to the modulated magnetic field on the transmitter coil establishes the communication link between the wireless power transmitter and the wireless power receiver in the wireless power system. The flux demodulator is configured to receive and demodulate the secondary voltage induced on the receiver coil for obtaining information from the wireless power transmitter.

In an embodiment, the flux demodulator in the receiver is configured as an analog signal processing chain comprising a peak detector, a filter gain block, and a comparator for decoding the information obtained from the transmitter via the established communication link. In another embodiment, the flux demodulator in the receiver is configured as a digital signal processing block for decoding the information obtained from the transmitter via the established communication link.

DETAILED DESCRIPTION OF THE INVENTION

Figure 1:
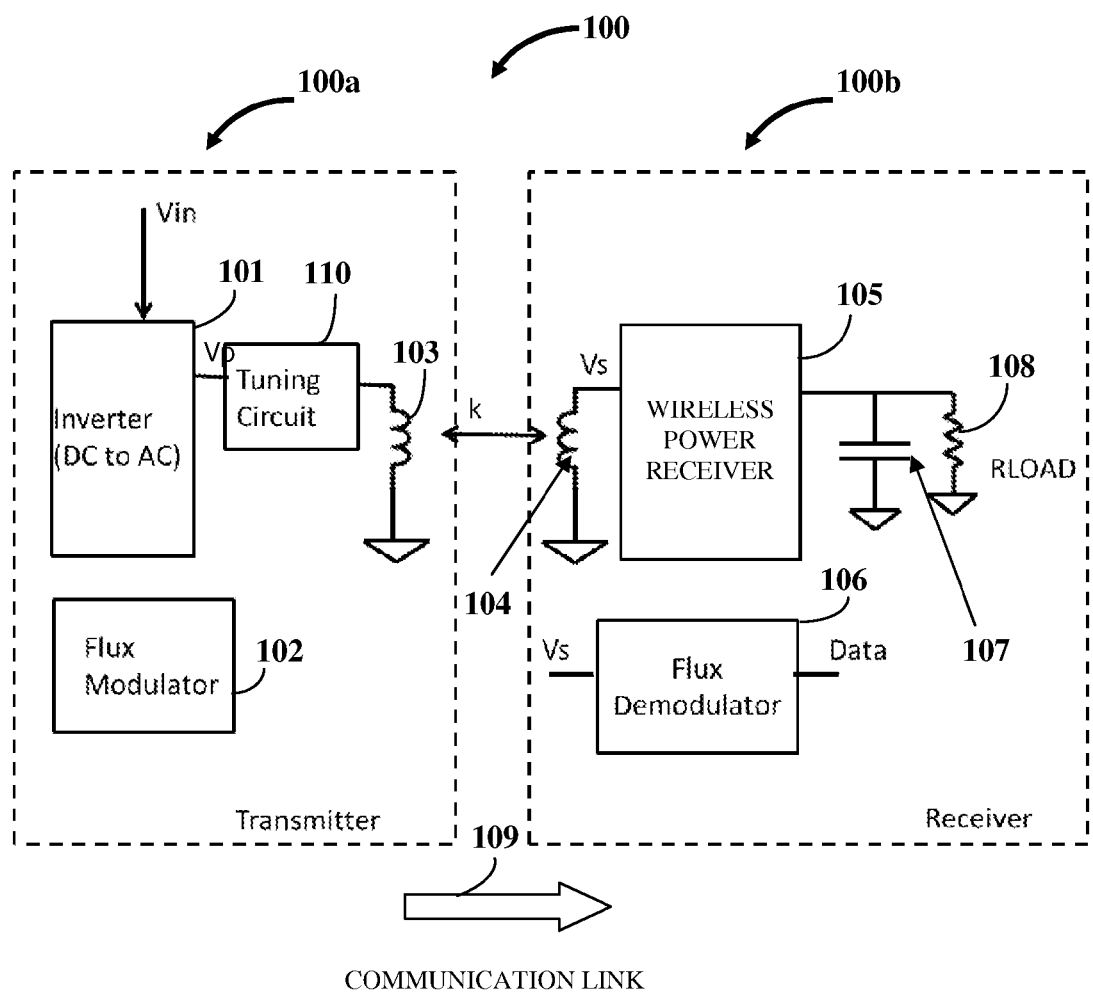
FIG. 1 exemplarily illustrates a schematic diagram of a system for establishing a communication link between a transmitter and a receiver of a wireless power system.

FIG. 1 exemplarily illustrates a schematic diagram of a system 100 for establishing a communication link 109 between a wireless power transmitter 100a and a wireless power receiver 100b of a wireless power system. The wireless power transmitter 100a comprises an inverter 101, a tuning circuit 110 and a transmitter coil 103. The transmitter coil 103 is, for example, an inductor. The tuning circuit 110 comprises one or more of passive electronic components, for example, a resistor, a capacitor, an inductor, a magnetic device, a transducer, etc.; active electronic components, for example, a diode, a transistor such as a metal oxide semiconductor field effect transistor (MOSFET), a bipolar transistor, etc., operational amplifiers, an optoelectronic device, directional coupler, etc., and electronic switches. The inverter 101 is a switch circuit that converts an input direct current (DC) at an input voltage of Vin into an alternating current (AC) at an output voltage of Vp. The voltage Vp represents the AC primary voltage. The primary voltage Vp is applied to the tuning circuit 110 and the transmitter coil 103 of the wireless power transmitter 100a to wirelessly transmit power to the wireless power receiver 100b. The AC passes through the transmitter coil 103 and emanates a varying magnetic field from the transmitter coil 103. This magnetic field in the transmitter coil 103 induces a voltage Vs in a receiver coil 104 of the wireless power receiver 100b which is in close proximity of the wireless power transmitter 100a. The voltage Vs is herein referred to as secondary voltage. An AC current is produced at the receiver coil 104 in the wireless power receiver 100b. A rectifier block (not shown) in the wireless power receiver 105 rectifies the AC current to obtain DC. A capacitor 107 in the wireless power receiver 100b filters stray AC components. A pure DC output is received across a load Rload 108.

The system 100 for establishing a peak flux modulation based communication link 109 between the wireless power transmitter 100a and the wireless power receiver 100b of the wireless power system comprises a flux modulator 102 operably disposed in the wireless power transmitter 100a and a flux demodulator 106 operably disposed in the wireless power receiver 100b. The flux modulator 102 utilizes the transmitter coil 103 of the wireless power transmitter 100a to send information in the form of messages to the flux demodulator 106. The flux demodulator 106 utilizes the receiver coil 104 of the wireless power receiver 100b to recover the messages transmitted by the flux modulator 102. The flux modulator 102 is configured to dynamically change the wireless power transmitter's 100a input impedance through a multitude of techniques, for example, an inductance change, a capacitance change, a resistance change, etc., and any combination thereof to change the current in the transmitter coil 103 and hence modulate the transmitted magnetic flux intensity. This represents a flux modulation performed at the wireless power transmitter 100a. The input to the flux demodulator 106 is the secondary voltage, Vs, induced on the receiver coil 104, as a result of flux emanating from the transmitter coil 103. The modulated magnetic field on the transmitted coil 103 induces a modulated secondary voltage on a receiver coil 104. The induction of a modulated secondary voltage on the receiver coil 104 proportional to the modulated magnetic field on the transmitter coil 103 establishes the communication link 109 from the wireless power transmitter 100a to the wireless power receiver 100b in the wireless power system.

The flux demodulator 106 in the wireless power receiver 100b is configured to receive and demodulate the secondary voltage induced on the receiver coil 104 for obtaining information, for example, in the form of messages from the wireless power transmitter 100a. The messages sent by the wireless power transmitter 100a are, for example, packet based messages, symbol based messages, etc., or any combination thereof. The system 100 disclosed herein allows the wireless power transmitter 100a to communicate with the wireless power receiver 100b, via the established communication link 109 for multiple applications, for example, authentication, exchange of diagnostic information, synchronization, etc.

Figure 2:
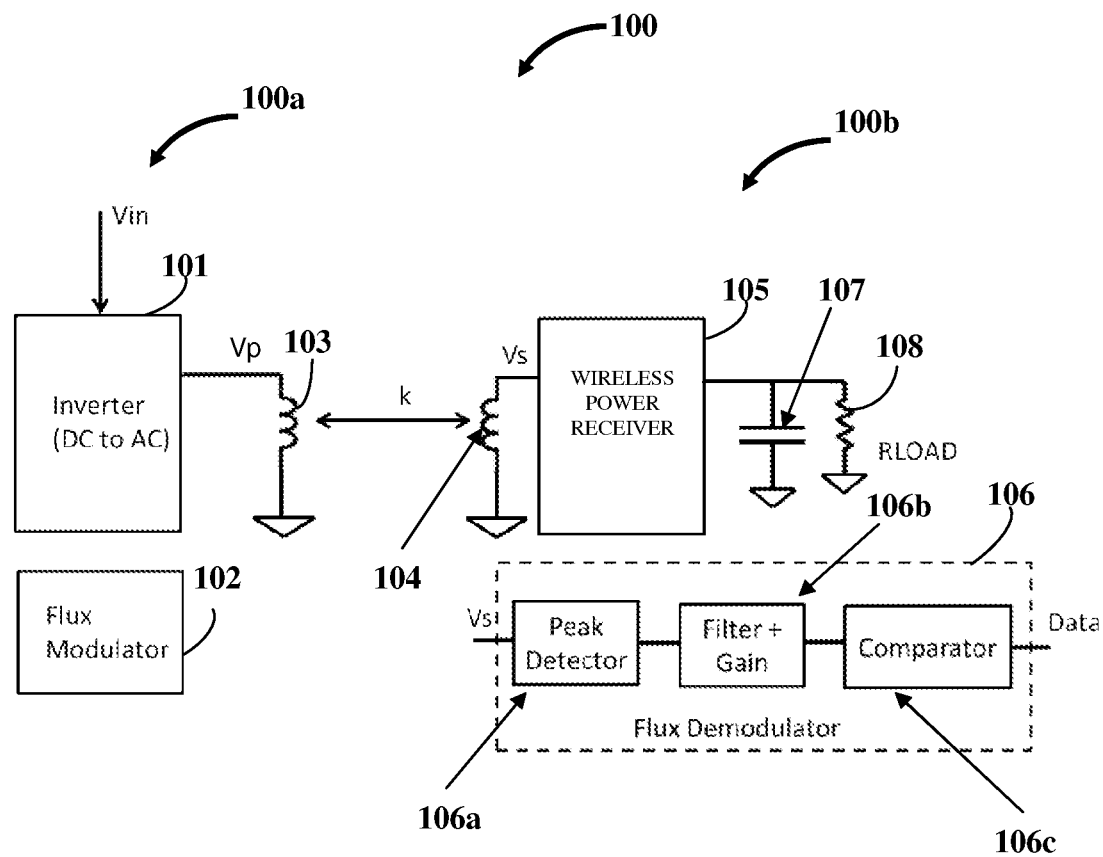
FIG. 2 exemplarily illustrates a first embodiment of the system for establishing a communication link between a transmitter and a receiver of a wireless power system, where a flux demodulator in the receiver is configured as an analog signal processing chain.

FIG. 2 exemplarily illustrates a first embodiment of the system 100 for establishing a communication link 109 between a wireless power transmitter 100a and a wireless power receiver 100b of a wireless power system, where the flux demodulator 106 in the wireless power receiver 100b is configured as an analog signal processing chain. The analog signal processing chain decodes the information obtained from the wireless power transmitter 100a via the established communication link 109 exemplarily illustrated in FIG. 1. The analog signal processing chain in the flux demodulator 106 processes the secondary voltage to obtain an analog representation of a message transmitted by the flux modulator 102. The flux demodulator 106 configured as the analog signal processing chain comprises a peak detector 106a, a filter gain block 106b, and a comparator 106c. The voltage induced across the receiver coil 104, Vs, is fed as an input to the peak detector 106a. The peak detector 106a determines the peak of the AC value and converts the peak of the AC value into a DC value that stays at the peak of the AC value. The filter gain block 106b removes unwanted frequency components from the DC signal and enhances the desired frequency components. The comparator 106c compares the input voltages and provides a digital data output to indicate the largest of the input voltages.

Figure 3:
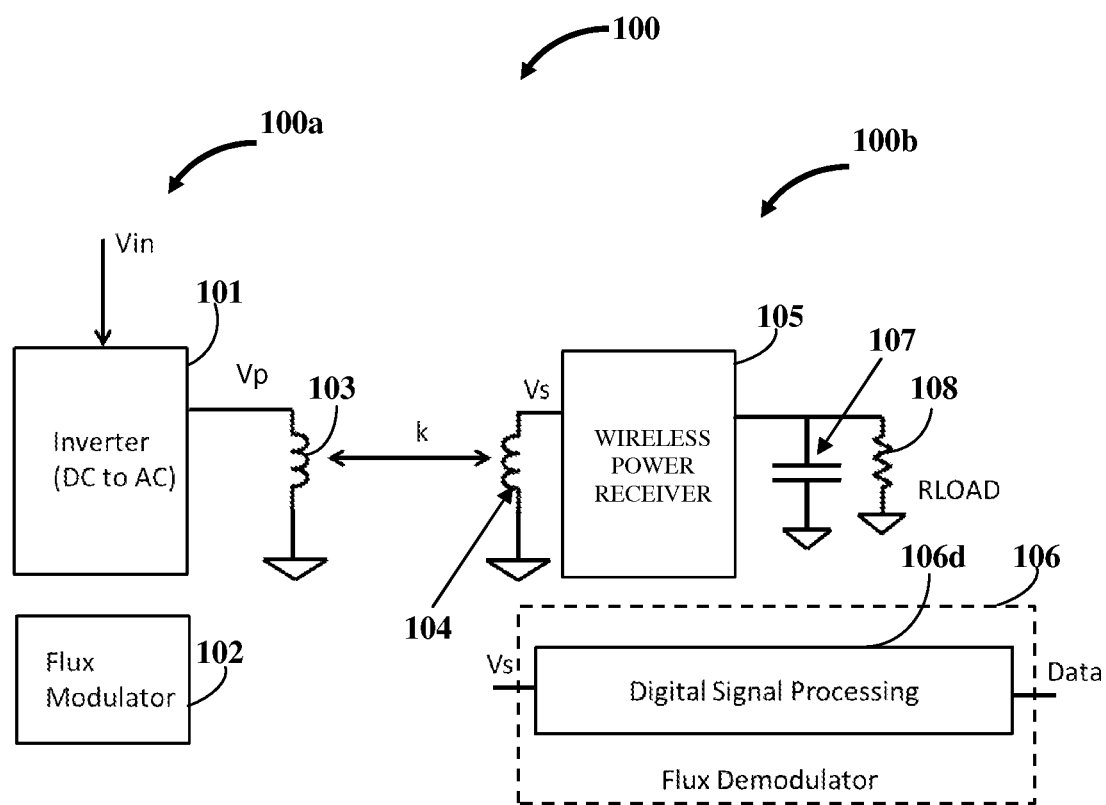
FIG. 3 exemplarily illustrates a second embodiment of the system for establishing a communication link between a transmitter and a receiver of a wireless power system, where the flux demodulator in the receiver is configured as a digital signal processing block.

FIG. 3 exemplarily illustrates a second embodiment of the system 100 for establishing a communication link 109 between a wireless power transmitter 100a and a wireless power receiver 100b of a wireless power system, where the flux demodulator 106 is configured as a digital signal processing block 106d. The digital signal processing block 106d converts the secondary voltage, Vs, induced across the receiver coil 104 that is directly fed as input to the digital signal processing block 106d, into digital data. That is, the digital signal processing block 106d decodes the information obtained from the wireless power transmitter 100a via the established communication link 109 exemplarily illustrated in FIG. 1. The digital signal processing block 106d processes the secondary voltage to obtain a digital representation of the message transmitted by the flux modulator 102. The digital signal processing block 106d recovers the message sent by the wireless power transmitter 100a.

Figure 4A:
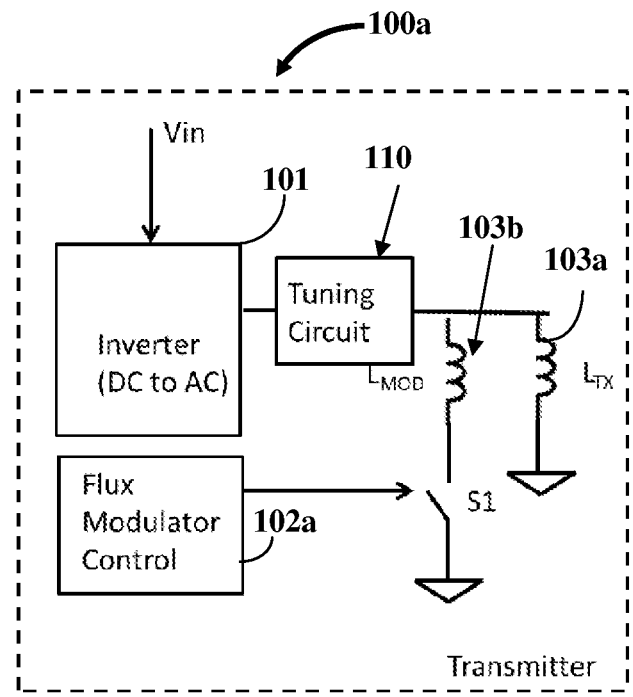
FIG. 4A exemplarily illustrates a first embodiment of a flux modulator in the wireless power transmitter of the wireless power system.

FIG. 4A exemplarily illustrates a first embodiment of the flux modulator 102 in the wireless power transmitter 100a of the wireless power system. The transmitter coil 103 comprises a primary coil 103a and a communication modulation coil 103b connected in parallel. The communication modulation coil 103b may be enclosed within the primary coil 103a or vice versa or the coils 103a and 103b may be placed distinctly away from each other. The primary coil 103a is represented as $L_{TX}$ and the communication modulation coil 103b is represented as $L_{MOD}$. The flux modulator control module 102a in the flux modulator 102 is configured to change the wireless power transmitter's 100a input impedance (as seen by the power source) by selecting the primary coil 103a or both the primary coil 103a and the communication modulation coil 103b using a switch S1. If switch S1 is open, current passes though the primary coil $L_{TX}$ 103a only, and the amount of flux generated in the transmitter coil 103 is transmitted to the receiver coil 104 at the wireless power receiver 100b. If switch S1 is closed, the primary coil $L_{TX}$ 103a and the communication modulation coil $L_{MOD}$ 103b are connected in parallel. The effective inductance of the transmitter coil 103 decreases, thereby affecting the current and the amount of flux generated in the transmitter coil 103 that is transmitted to the receiver coil 104 at the wireless power receiver 100b. The change in effective inductance changes the current through the transmitter coil 103a which in turn modulates the intensity of the magnetic field produced by the wireless power transmitter 100a. By opening and closing switch S1, the flux modulator control module 102a modulates the flux thereby creating the communication channel from the wireless power transmitter 100a to the wireless power receiver 100b.

Figure 4B:
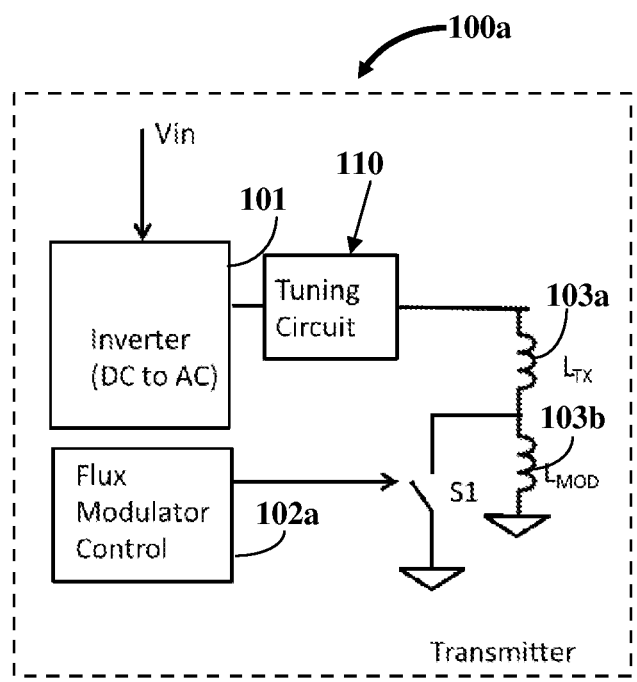
FIG. 4B exemplarily illustrates a second embodiment of the flux modulator in the transmitter of the wireless power system.

FIG. 4B exemplarily illustrates a second embodiment of the flux modulator 102 in the wireless power transmitter 100a of the wireless power system. The transmitter coil 103 comprises a primary coil 103a and a communication modulation coil 103b connected in series. The communication modulation coil 103b may be enclosed within the primary coil 103a or vice versa or the coils 103a and 103b may be placed distinctly away from each other. The primary coil 103a is represented as $L_{TX}$ and the communication modulation coil 103b is represented as $L_{MOD}$. The flux modulator control module 102a in the flux modulator 102 is configured to change the wireless power transmitter's 100a input impedance (as seen by the power source) by selecting the primary coil 103a or both the primary coil 103a and the communication modulation coil 103b. If switch S1 is closed, current passes through the primary coil $L_{TX}$ 103a and the amount of flux generated in the transmitter coil 103 is transmitted to the receiver coil 104 at the wireless power receiver 100b. If switch S1 is open, the communication modulation coil $L_{MOD}$ 103b and the primary coil $L_{TX}$ 103a are connected in series. The effective inductance increases, thereby affecting the current and the amount of flux generated in the transmitter coil 103 that is transmitted to the receiver coil 104 at the wireless power receiver 100b. The change in effective primary inductance changes the current through the transmitter coil 103a which in turn modulates the intensity of the magnetic field produced by the wireless power transmitter 100a. By opening and closing switch S1, the flux modulator control module 102a modulates the flux thereby creating the communication channel from the wireless power transmitter 100a to the wireless power receiver 100b.

Figure 5A:
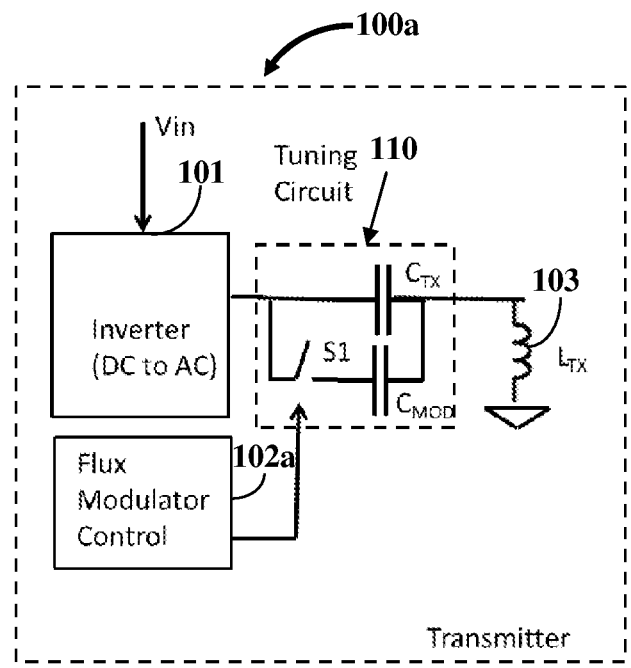
FIG. 5A exemplarily illustrates a third embodiment of the flux modulator in the transmitter of the wireless power system.

FIG. 5A exemplarily illustrates a third embodiment of the flux modulator 102 in the wireless power transmitter 100a of the wireless power system. The tuning circuit 110 is in series with the transmitter coil 103. The tuning circuit 110 comprises a primary capacitor and a communication modulation capacitor that is connected in parallel with the primary capacitor. The primary capacitor is represented as $C_{TX}$ and the communication modulation capacitor is represented as $C_{MOD}$. The flux modulator control module 102a in the flux modulator 102 is configured to change the wireless power transmitter's 100a input impedance (as seen by the power source) by selecting the primary capacitor or both the primary capacitor and the communication modulation capacitor. If switch S1 is open, the impedance of the tuning circuit 110 is $(-j/W*C_{TX})$. If switch S1 is closed, the impedance of the tuning circuit 110 changes to $(-j/W*(C_{TX}+C_{MOD}))$. This change in impedance of the tuning circuit 110 changes the impedance of the wireless power transmitter 100a and hence, the current that passes through the primary coil $L_{TX}$ 103. The change in current through the transmitter coil 103 in turn modulates the intensity of the magnetic flux field produced by the wireless power transmitter 100a that is transmitted to the receiver coil 104 at the wireless power receiver 100b. By opening and closing switch S1, the flux modulator control module 102a modulates the flux thereby creating the communication channel from the wireless power transmitter 100a to the wireless power receiver 100b.

Figure 5B:
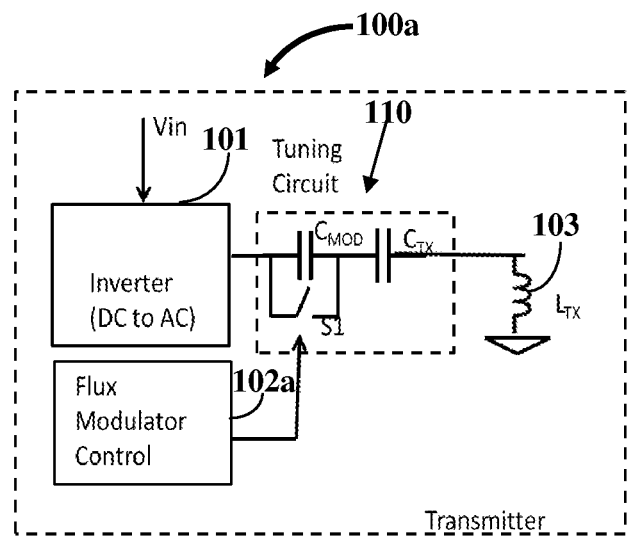
FIG. 5B exemplarily illustrates a fourth embodiment of the flux modulator in the transmitter of the wireless power system.

FIG. 5B exemplarily illustrates a fourth embodiment of the flux modulator 102 in the wireless power transmitter 100a of the wireless power system. The tuning circuit 110 is in series with the transmitter coil 103. The tuning circuit 110 comprises a primary capacitor and a communication modulation capacitor that is connected in series with the primary capacitor. The primary capacitor is represented as $C_{TX}$ and the communication modulation capacitor is represented as $C_{MOD}$. The flux modulator control module 102a in the flux modulator 102 is configured to change the wireless power transmitter's 100a input impedance (as seen by the power source) by selecting the primary capacitor or both the primary capacitor and the communication modulation capacitor. If switch S1 is open, the impedance of the tuning circuit 110 is the primary capacitor in series with the communication modulation capacitor which is $(-j/W*C_{new})$ where Cnew is $(C_{TX}*C_{MOD}(C_{TX}+C_{MOD}))$ If switch S1 is closed, the impedance of the tuning circuit 110 changes to $(-j/W*C_{TX})$. This change in impedance of the tuning circuit 110 changes the impedance of the wireless power transmitter 100a and hence, the current that passes through the primary coil $L_{TX}$ 103. The change in current through the transmitter coil 103 in turn modulates the intensity of the magnetic flux field produced by the wireless power transmitter 100a that is transmitted to the receiver coil 104 at the wireless power receiver 100b. By opening and closing switch S1, the flux modulator control module 102a modulates the flux thereby creating the communication channel from the wireless power transmitter 100a to the wireless power receiver 100b.

Figure 5C:
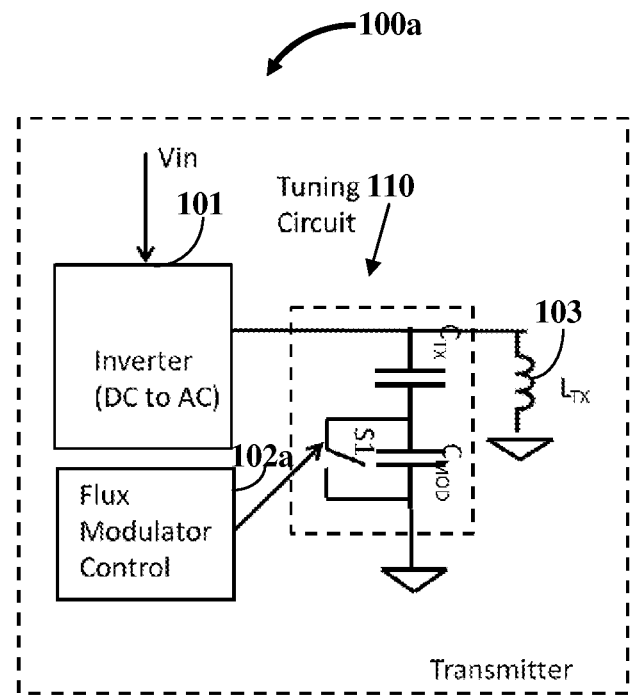
FIG. 5C exemplarily illustrates a fifth embodiment of the flux modulator in the transmitter of the wireless power system.

FIG. 5C exemplarily illustrates a fifth embodiment of the flux modulator 102 in the wireless power transmitter 100a of the wireless power system. The tuning circuit 110 is in parallel with the transmitter coil 103. The tuning circuit 110 comprises a primary capacitor and a communication modulation capacitor that is connected in series with the primary capacitor. The primary capacitor is represented as $C_{TX}$ and the communication modulation capacitor is represented as $C_{MOD}$. The flux modulator control module 102a in the flux modulator 102 is configured to change the wireless power transmitter's 100a input impedance (as seen by the power source) by selecting the primary capacitor or both the primary capacitor and the communication modulation capacitor. If switch S1 is open, the impedance of the tuning circuit 110 is the primary capacitor in series with the communication modulation capacitor which is $(-j/W*C_{new})$ where Cnew is $(C_{TX}*C_{MOD}/(C_{TX}+C_{MOD}))$. If switch S1 is closed, the impedance of the tuning circuit 110 changes to $(-j/W*C_{TX})$. This change in impedance of the tuning circuit 110 changes the impedance of the wireless power transmitter 100a and hence, the current that passes through the primary coil $L_{TX}$ 103. The change in current through the transmitter coil 103 in turn modulates the intensity of the magnetic flux field produced by the wireless power transmitter 100a that is transmitted to the receiver coil 104 at the wireless power receiver 100b. By opening and closing switch S1, the flux modulator control module 102a modulates the flux thereby creating the communication channel from the wireless power transmitter 100a to the wireless power receiver 100b.

Figure 5D:
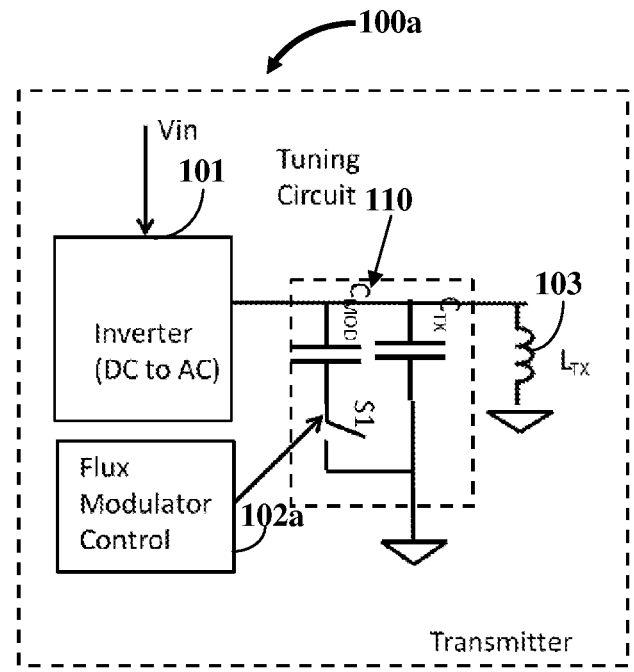
FIG. 5D exemplarily illustrates a sixth embodiment of the flux modulator in the transmitter of the wireless power system.

FIG. 5D exemplarily illustrates a sixth embodiment of the flux modulator 102 in the wireless power transmitter 100a of the wireless power system. The tuning circuit 110 is in parallel with the transmitter coil 103. The tuning circuit 110 comprises a primary capacitor and a communication modulation capacitor that is connected in parallel with the primary capacitor. The primary capacitor is represented as $C_{TX}$ and the communication modulation capacitor is represented as $C_{MOD}$. The flux modulator control module 102a in the flux modulator 102 is configured to change the wireless power transmitter's 100a input impedance (as seen by the power source) by selecting the primary capacitor or both the primary capacitor and the communication modulation capacitor. If switch S1 is open, the impedance of the tuning circuit 110 is $(-j/W*C_{TX})$. If switch S1 is closed, the impedance of the tuning circuit 110 changes to $(-j/W*(C_{TX}+C_{MOD}))$. This change in impedance of the tuning circuit 110 changes the impedance of the wireless power transmitter 100a and hence, the current that passes through the primary coil $L_{TX}$ 103. The change in current through the transmitter coil 103 in turn modulates the intensity of the magnetic flux field produced by the wireless power transmitter 100a that is transmitted to the receiver coil 104 at the wireless power receiver 100b. By opening and closing switch S1, the flux modulator control module 102a modulates the flux thereby creating the communication channel from the wireless power transmitter 100a to the wireless power receiver 100b.

Figure 6A:
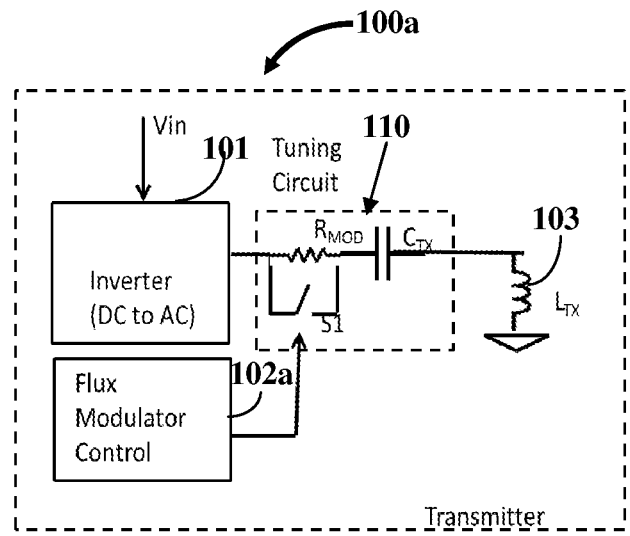
FIG. 6A exemplarily illustrates a seventh embodiment of the flux modulator in the transmitter of the wireless power system.

FIG. 6A exemplarily illustrates a seventh embodiment of the flux modulator 102 in the wireless power transmitter 100a of the wireless power system. The tuning circuit 110 is in series with the transmitter coil 103. The tuning circuit 110 comprises a primary capacitor and a communication modulation resistor that is connected in series with the primary capacitor. The primary capacitor is represented as $C_{TX}$ and the communication modulation resistor is represented as $R_{MOD}$. The flux modulator control module 102a in the flux modulator 102 is configured to change the wireless power transmitter's 100a input impedance (as seen by the power source) by selecting the primary capacitor or both the primary capacitor and the communication modulation resistor. If switch S1 is open, the impedance of the tuning circuit 110 is $(-j/W*C_{TX})$ where W is the operating angular frequency of the system. If switch S1 is closed, the impedance of the tuning circuit 110 changes to $(R_{MOD}-j/(W*C_{TX}))$. This change in impedance of the tuning circuit 110 changes the impedance of the wireless power transmitter 100a and hence, the current that passes through the primary coil $L_{TX}$ 103. The change in current through the transmitter coil 103 in turn modulates the intensity of the magnetic flux field produced by the wireless power transmitter 100a that is transmitted to the receiver coil 104 at the wireless power receiver 100b. By opening and closing switch S1, the flux modulator control module 102a modulates the flux thereby creating the communication channel from the wireless power transmitter 100a to the wireless power receiver 100b.

Figure 6B:
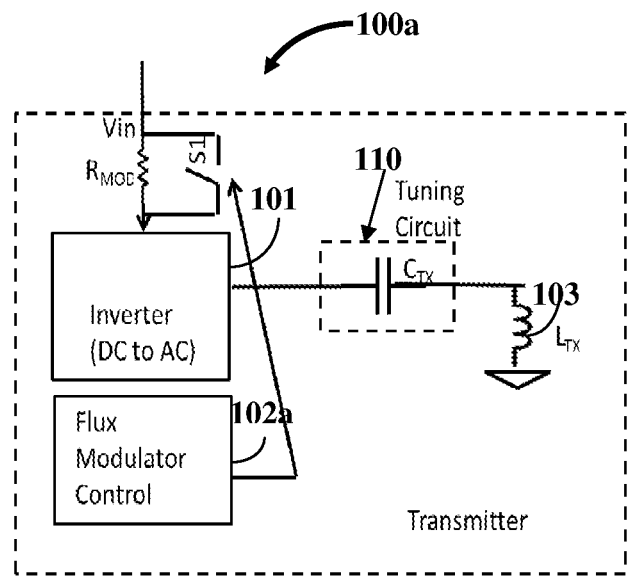
FIG. 6B exemplarily illustrates an eighth embodiment of the flux modulator in the transmitter of the wireless power system.

FIG. 6B exemplarily illustrates an eighth embodiment of the flux modulator 102 in the wireless power transmitter 100a of the wireless power system. In this embodiment, a communication modulation resistor $R_{MOD}$ with a switch S1 across it is placed between the input power source Vin and the inverter 101. The flux modulator control module 102a in the flux modulator 102 is configured to change the wireless power transmitter's 100a input impedance (as seen by the power source) by including or bypassing the communication modulation resistor in the current path. If switch S1 is closed, the communication modulation resistor is excluded from the current path. If switch S1 is open, the communication modulation resistor is included in the current path. The inclusion and exclusion of the communication modulation resistor changes the impedance of the wireless power transmitter 100a and hence, the current that passes through the primary coil $L_{TX}$ 103. The change in current through the transmitter coil 103 in turn modulates the intensity of the magnetic flux field produced by the wireless power transmitter 100a that is transmitted to the receiver coil 104 at the wireless power receiver 100b. By opening and closing switch S1, the flux modulator control module 102a modulates the flux thereby creating the communication channel from the wireless power transmitter 100a to the wireless power receiver 100b.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A system for establishing a communication link in a wireless power system, comprising:
   a flux modulator operably disposed in a wireless power transmitter of said wireless power system, said flux modulator configured to dynamically change effective input impedance of said wireless power transmitter so as to modulate a current and a magnetic field produced on transmitter coil of said wireless power transmitter when a primary voltage is applied to said wireless power transmitter, said change to said input impedance initiated by said flux modulator in said wireless power transmitter while said wireless power transmitter is providing system, said change to said input impedance achieved by one or multiple of:
   said transmitter coil comprising a primary could and a connection modulation coil, said flax modulator selecting one of said primary coil and combination of said primary coil and said communication modulation coil to cause said change in said input impedance;
   said wireless power transmitter comprising a tuning circuit, said tuning circuit comprising a primary capacitor and a communication modulation capacitor, said flux modulator selecting one of said primary capacitor and a combination of said primary capacitor and said communication modulation capacitor to cause said change in said input impedance; and
   said wireless power transmitter comprising said tuning circuit, said tuning circuit comprising a primary capacitor and a communication modulation resistor, said flux modulator selecting one of said primary capacitor and a combination of said primary capacitor and said communication modulation resistor to cause said change in said input impedance;
   and
   a flux demodulator operably disposed in said wireless power receiver of said wireless power system, said flux demodulator configured to receive and demodulate a secondary voltage induced on a receiver coil due to said modulated magnetic field on said transmitter coil for obtaining information from said wireless power transmitter, whereby said induction of said secondary voltage on said receiver coil due to said modulated magnetic field on said transmitter coil establishes said communication link between said transmitter and said receiver in said wireless power system.

2. The system of claim 1, wherein said flux demodulator is configured as an analog signal processing chain comprising a peak detector, a filter gain block, and a comparator for decoding said information obtained from said transmitter via said established communication link.

3. The system of claim 1, wherein said flux demodulator is configured as a digital signal processing block for decoding said information obtained from said transmitter via said established communication link.

4. A method for establishing a communication link in a wireless power system, comprising:

operably disposing a flu modulator in a wireless power transmitter of said wireless power system and a flux demodulator in a wireless power receiver of said wireless power system;

configuring said flux modulator to dynamically change the effective input impedance of said wireless power transmitter to modulate a current and a magnetic field produced on transmitter coil of said wireless power transmitter when a primary voltage is applied to said wireless power transmitter, said change to said input impedance initiated by said flux modulator while said wireless power transmitter is providing wireless power to said wireless power receiver of said wireless power system, said change to said input impedance achieved by one or multiple of:

said transmitter coil comprising a primary coil and a communication modulation coil, said flux modulator selecting one of said primary coil and a combination of said primary coil said communication modulation coil to cause said change in said input impedance; and said wireless power transmitter comprising a tuning circuit, said tuning circuit comprising a primary capacitor and a communication modulation capacitor, said flux modulator selecting one of said primary capacitor and a combination of said primary capacitor and said communication modulation capacitor to cause said change in said input impedance; and said wireless power transmitter comprising said tuning circuit, said tuning circuit comprising a primary capacitor and a communication modulation resistor, said flux modulator selecting one of said primary capacitor and a combination of said primary capacitor and said communication modulation resistor to cause said change in said input impedance, and inducing a secondary voltage on a receiver coil by said modulated magnetic field on said transmitter coil for establishing said communication link between said wireless power transmitter and said wireless power receiver, wherein said induce secondary voltage is received and demodulated by said flux demodulator in said wireless power receiver for obtaining information from said wireless power transmitter.

5. The method of claim 4, wherein said flux demodulator is configured as one of an analog signal processing chain and a digital signal processing block for decoding said information obtained from said wireless power transmitter via said established communication link.

* * * * *